(12) United States Patent
Bolte et al.

(10) Patent No.: US 12,422,249 B2
(45) Date of Patent: Sep. 23, 2025

(54) METHOD FOR DETERMINING AT LEAST ONE GEOMETRIC PARAMETER OF A STRAND- OR PLATE-SHAPED OBJECT

(71) Applicant: Sikora AG, Bremen (DE)

(72) Inventors: Hilmar Bolte, Bremen (DE); Harald Sikora, Bremen (DE); Kolja T. Schuh, Bremen (DE)

(73) Assignee: Sikora AG, Bremen (DE)

( * ) Notice: Subject to any disclaimer, the term of this patent is extended or adjusted under 35 U.S.C. 154(b) by 343 days.

(21) Appl. No.: 18/026,962

(22) PCT Filed: Aug. 2, 2021

(86) PCT No.: PCT/EP2021/071572
§ 371 (c)(1),
(2) Date: Mar. 17, 2023

(87) PCT Pub. No.: WO2022/058081
PCT Pub. Date: Mar. 24, 2022

(65) Prior Publication Data
US 2024/0027183 A1 Jan. 25, 2024

(30) Foreign Application Priority Data

Sep. 17, 2020 (DE) ..................... 10 2020 124 263.8

(51) Int. Cl.
*B29C 48/92* (2019.01)
*B29C 48/07* (2019.01)
(Continued)

(52) U.S. Cl.
CPC .............. *G01B 11/06* (2013.01); *B29C 48/07* (2019.02); *B29C 48/09* (2019.02); *B29C 48/92* (2019.02);
(Continued)

(58) Field of Classification Search
CPC ......... B29C 48/06; B29C 48/07; B29C 48/09; B29C 48/92; B29C 2948/92123;
(Continued)

(56) References Cited

U.S. PATENT DOCUMENTS

2015/0331414 A1 11/2015 David

FOREIGN PATENT DOCUMENTS

| CA | 2891456 A1 | 11/2015 |
| DE | 102018124175 A1 | 4/2020 |

(Continued)

OTHER PUBLICATIONS

English translation of WO 2019/166420 A1 (Year: 2019).*

(Continued)

*Primary Examiner* — Mark R Gaworecki
(74) *Attorney, Agent, or Firm* — Barclay Damon LLP (57) ABSTRACT

A method is disclosed for determining at least one geometric parameter of an object comprising a molten component. The method includes determining a relationship between a refractive index of the object and a shrinkage occurring during a solidification of the object. The refractive index and at least one geometric parameter of the object comprising the molten component is determined using a measuring apparatus. At least one geometric parameter of the solidified object from the refractive index and the at least one geometric parameter of the object comprising the molten component is determined using the measuring apparatus and taking into account the determined relationship between the refractive index of the object and the shrinkage occurring during the solidification of the object.

15 Claims, 5 Drawing Sheets

(51) Int. Cl.
  *B29C 48/09* (2019.01)
  *G01B 11/06* (2006.01)
  *G01B 11/08* (2006.01)
  *G01B 11/12* (2006.01)
  *G01B 21/08* (2006.01)
  *G01B 21/12* (2006.01)
  *B29C 48/06* (2019.01)

(52) U.S. Cl.
  CPC .............. *G01B 11/08* (2013.01); *G01B 11/12* (2013.01); *G01B 21/08* (2013.01); *G01B 21/12* (2013.01); *B29C 48/06* (2019.02); *B29C 2948/92123* (2019.02); *B29C 2948/92152* (2019.02); *B29C 2948/92171* (2019.02); *B29C 2948/92247* (2019.02); *B29C 2948/92447* (2019.02); *B29C 2948/92609* (2019.02); *B29C 2948/92666* (2019.02); *B29C 2948/92942* (2019.02)

(58) Field of Classification Search
  CPC .......... B29C 2948/92152; B29C 2948/92171; B29C 2948/92247; B29C 2948/92447; B29C 2948/92609; B29C 2948/92666; B29C 2948/92942; G01B 11/06; G01B 11/08; G01B 11/12; G01B 21/08; G01B 21/12
  See application file for complete search history.

(56) References Cited

FOREIGN PATENT DOCUMENTS

| | | |
|---|---|---|
| DE | 102018128248 A1 | 5/2020 |
| EP | 0400310 A2 | 12/1990 |
| JP | 199110826 A | 9/1992 |
| WO | 2016139155 A1 | 9/2016 |
| WO | WO-2019166420 A1 * | 9/2019 ............. B29C 48/09 |
| WO | 2020070047 A1 | 4/2020 |
| WO | WO-2021008770 A1 * | 1/2021 ............. B29C 48/09 |

OTHER PUBLICATIONS

English translation of WO 2021/008770 A1 (Year: 2021).*
PCT/EP2021/071572; filed Aug. 2, 2021; International Search Report/Written Opinion; date of Mailing Oct. 27, 2021 (10 pages).
PCT/EP2021/071572; filed Aug. 2, 2021; English Translation of International Search Report; date of Mailing Oct. 27, 2021 (2 pages).
JP 2023-516627; filed Feb. 4, 2021; Notification of Reasons for Refusal; Dispatch Date Jan. 30, 2024 (2 pages).
JP 2023-516627; filed Feb. 4, 2021; English translation of Notification of Reasons for Refusal; Dispatch Date Jan. 30, 2024 (2 pages).

* cited by examiner

METHOD FOR DETERMINING AT LEAST ONE GEOMETRIC PARAMETER OF A STRAND- OR PLATE-SHAPED OBJECT

CROSS REFERENCE TO RELATED INVENTION

This application is a national stage application pursuant to 35 U.S.C. § 371 of International Application No. PCT/EP2021/071572, filed on Aug. 2, 2021, which claims priority to, and benefit of, German Patent Application No. 10 2020 124 263.8, filed Sep. 17, 2020, the entire contents of which are hereby incorporated by reference.

TECHNOLOGICAL FIELD

The invention relates to a method for determining at least one geometric parameter of a strand- or plate-shaped object which has not yet completely solidified and which still has flowable components.

BACKGROUND

By way of example, strand-shaped plastic objects are manufactured in extrusion systems and conveyed along a conveying direction, by way of example, through cooling sections until they have cooled completely to ambient temperature and are accordingly completely hardened or, respectively solidified. Immediately after exiting the extrusion system and over a further region of the conveying section, such strands are not yet completely solidified and accordingly still have flowable components in the form of a molten mass.

Methods and devices are known from WO 2016/139155 A1 and DE 10 2018 128 248 A1, with which the refractive index of strand- or plate-shaped plastic objects can be determined by irradiating the objects with terahertz radiation and receiving the terahertz radiation reflected by the objects. This is an average refractive index over the cross-section of the object or, respectively the irradiated portion of the object. On this basis, geometric parameters of the object, e.g., a wall thickness or a diameter of tubes, can be reliably determined even if the refractive index is initially unknown.

In particular, when the objects are measured shortly after exiting the extrusion system, the thus ascertained geometric parameters can, admittedly, deviate from the actual geometric parameters in the completely solidified state of the object. More reliable results could be obtained during a later determination of the refractive index and geometric parameters, if the object is already completely solidified, that is to say substantially no longer has any flowable components. On the other hand, there is a desire to determine the geometric parameters as quickly as possible after exiting an extrusion system, for example, in order to be able to intervene in the production process as quickly as possible in the event of incorrect parameters and, therefore, be able to minimize rejects.

There is therefore a need to already be able to determine geometric parameters of the strand- or plate-shaped object in the completely solidified state, even when measuring a strand- or plate-shaped object in the not yet completely solidified state when the latter still has flowable components.

Proceeding from the explained prior art, the object of the invention is therefore to be able to already make a reliable statement regarding geometric parameters of the strand- or plate-shaped object in the completely solidified state when the strand- or plate-shaped object is in the not yet completely solidified state.

BRIEF SUMMARY OF THE INVENTION

An embodiment of aa method for determining at least one geometric parameter of an object includes determining
 a relationship between the refractive index of the object and a shrinkage occurring in the course of complete solidification of the object.
The refractive index and at least one geometric parameter of the object, which is not yet completely solidified, are determined.

The at least one geometric parameter of the object in a solidified state is determined from the refractive index values and the at least one geometric parameter while taking into consideration the relationship between the refractive index of the object and a shrinkage occurring in the course of complete solidification of the object. In an embodiment, the object comprises a strand- or plate-shaped object.

In an embodiment, the strand- or plate-shaped object investigated according to the invention is in a heated state, by way of example, coming from a production system, and has not yet completely cooled down to ambient temperature. Accordingly, it is not yet completely solidified and has, in particular in its interior, not yet completely hardened, viscous constituents in the form of a molten mass which only harden as it cools down further. In the course of the further cooling and, therefore, solidification of the strand- or plate-shaped object, this results in shrinkage of the material of the object. The strand- or plate-shaped object can be a strand or a plate, for example a plastic strand or a plastic plate. A production system producing the strand- or plate-shaped object can, for example, be an extrusion system. The strand- or plate-shaped object can, accordingly, be a strand- or plate-shaped object extruded in an extrusion system. The strand can be, by way of example, a tube. Furthermore, the object can be conveyed along a conveying direction, for example along its longitudinal axis, during the determination of at least one geometric parameter according to the invention.

The present invention is based on the finding that a relationship which can be described well mathematically exists between the refractive index of the material of the object and the shrinkage process in the course of the complete solidification of the strand- or plate-shaped object. Investigations have shown that the refractive index exhibits an approximately inverse behavior to geometric parameters such as, for example, the wall thickness or the diameter of a tube over the solidification period of the strand- or plate-shaped object. While the refractive index increases as solidification increases, that is to say over time, geometric parameters such as the diameter and wall thickness decrease accordingly. This is explained in greater detail below with reference to the drawings. Investigations have further shown that this relationship is specific to the respective strand- or plate-shaped object, in particular the exact composition of the material. However, good reproducibility is exhibited for a specific material.

Based on this finding, in the case of the method according to the invention for the strand- or plate-shaped object to be determined in each case, a relationship between the refractive index of the strand- or plate-shaped object and the shrinkage process occurring up to its complete solidification is ascertained in an ascertaining step. Said relationship which can be ascertained, for example in the form of a characteristic curve, is utilized according to the invention in order to infer a shrinkage of the material which is still to be expected using a determination of the refractive index of the material in the not yet completely solidified state. To this end, the refractive index and at least one geometric parameter of the strand- or plate-shaped object which has not yet completely solidified and which still has flowable components are determined in a determining step. The corresponding (shrunken) value of the geometric parameter in the completely solidified state of the strand- or plate-shaped object can now be inferred from the shrinkage to be expected, which is established by means of the previously ascertained relationship, using the geometric parameter determined in the not yet completely solidified state. Accordingly, the at least one geometric parameter is calculated in the completely solidified state of the strand- or plate-shaped object, according to the invention, from the refractive index values determined in the determining step and the at least one geometric parameter while taking into consideration the relationship ascertained in the ascertaining step.

As will be explained in greater detail below, the refractive index in particular of plastics is greatly dependent on the temperature in a non-linear manner. This changes particularly significantly during the transition from solid to liquid. Accordingly, a geometric parameter, which is determined for a strand- or plate-shaped object which has not yet completely solidified, is still subject to changes in the course of further solidification, in particular due to the shrinkage which varies with the proportion of the molten mass which has not yet solidified inside the strand- or plate-shaped object. The degree of shrinkage greatly depends on the material composition of the strand- or plate-shaped object and also depends, to a lesser extent, on the dimensions of the strand- or plate-shaped object. Accordingly, the assumption which is made in the prior art that the shrinkage is constant, and a prediction based thereon of a geometric parameter determined in the not completely solidified state, are not sufficiently precise in the completely solidified state. In order to achieve a good forecast of the cold values of the at least one geometric parameter, a separate degree of shrinkage is rather determined, according to the invention, for each strand- or plate-shaped object, that is to say, for the respective product. Therefore, the respective material composition and the dimensions of the object are taken into consideration. In addition to the material composition and the dimensions, the shrinkage can also depend to a lesser extent on production conditions such as the production speed. Thus, for example, the proportion of the molten mass and, therefore, the refractive index change with the production speed. Therefore, the degree of shrinkage or, respectively the relationship ascertained in the ascertaining step can also be determined for the respective production conditions, that is to say for example a determined production speed, in order to recognize the influences of different production speeds.

According to the invention, the geometric parameter to be determined in each case can thus be reliably predicted in its final value in the completely solidified state of the strand- or plate-shaped object, even during an early measurement in the not yet completely solidified state of the strand- or plate-shaped object. Since the relationship is recorded for the strand- or plate-shaped object to be measured in each case, and preferably also for the respective production conditions, a change, including a possibly unrecognized change, in the composition of the material or other parameters of the production process, by way of example, does not have a falsifying effect on the result of the determination according to the invention.

It is a prerequisite for ascertaining the degree of shrinkage that the refractive index of the material of the object in the completely solidified state is known. This can either be determined, by way of example, in one of the ways explained below for determining the refractive index or, if it is known with sufficient accuracy, can be assumed to be known for the present material of the object in each case.

With the method according to the invention for predicting the shrinkage of geometric parameters to be expected such as, for example, the wall thickness and the diameter of a tube, the relevant measured values can already be recorded in an extrusion line shortly after extrusion and, despite a proportionate molten mass in the wall, for example of a tube, the final values to be expected can be predicted and displayed based on the standard temperature of 22° C., but can also be deployed as an actual value for regulation to the nominal size.

The extrusion, for example, of tubes having diameters up to 2.5 m occurs at creep speeds of a few centimeters up to approximately one meter per minute. Conventional measuring systems can only measure the relevant parameters after approximately 30 to 50 meters at the end of the extrusion line, that is to say, after hours. An early measurement in order to adjust the wall thickness to the nominal size to be expected and the uniformity thereof over the circumference of the tube is of considerable economic importance. The output capacity of a typical extruder is approximately 400 kg/h; at 5000 h/year, a material consumption of 2 million kg can be assumed. At a price of slightly more than 1 euro/kg, the method according to the invention can easily save 100,000 to 200,000 euros per year compared to the prior art.

According to a particularly practical embodiment, the geometric parameter can be the diameter and/or the wall thickness of a tube, wherein, in the determining step, a relationship between the refractive index of the tube and a shrinkage occurring in the course of its complete solidification is ascertained for the diameter and/or the wall thickness of the tube. In particular, if both the wall thickness and the diameter are ascertained as geometric parameters, that is to say that there can be a relationship between the refractive index and the shrinkage for the wall thickness and for the diameter in each case. This embodiment is based on the finding that the degree of shrinkage can be different for different geometric parameters. This has been established by appropriate investigations. By way of example, the shrinkage of the diameter in the course of the complete solidification can be smaller by a factor of 2 to 3 than for the wall thickness. It is assumed that the reason for this is in particular that the outside of a tube which specifies the diameter already cools down early on and solidifies so that the diameter of the tube no longer shrinks so significantly while viscous components are still present in particular inside the tube, wherein the inside of the tube also cools down and therefore solidifies later than the outside so that a greater shrinkage occurs in the wall thickness. In practice, the relative degree of shrinkage can lie, for example, in the region of 2 to 3% for the diameter and, by way of example, in the region of 6 to 8% for the wall thickness. It goes without saying that these values can vary depending on the material, the dimensions of the strand- or plate-shaped object and the respective production conditions. By way of example, considerably larger degrees of shrinkage of more than 15% can result in the case of particularly large tubes, in particular since the surface area increases less significantly, as the tube diameter increases, than the volume.

As already explained, the strand- or plate-shaped object can come from an extrusion system and can be conveyed along its longitudinal direction during the determination of the at least one geometric parameter.

According to a further embodiment, the relationship can be ascertained in the ascertaining step by determining the refractive index and the at least one geometric parameter at multiple points in time and/or at multiple locations of the strand- or plate-shaped object. In this way, supporting values can be acquired, for example for a characteristic curve which visualizes the relationship. It is then possible to interpolate between the supporting values accordingly, for example. It goes without saying that the reliability of the values ascertained for the relationship increases with the number of supporting values.

According to a further embodiment regarding this, the relationship can be ascertained in the ascertaining step by allowing the strand- or plate-shaped object to solidify completely at least along a longitudinal portion, wherein the refractive index and the at least one geometric parameter are determined multiple times during the complete solidification. For example, it would be conceivable, in a first step, to stop a strand- or plate-shaped object coming from an extrusion system, that is to say to interrupt the production and then to determine the refractive index and the at least one geometric parameter at multiple points in times, by way of example, substantially continually, up to complete solidification of the strand- or plate-shaped object.

As already explained, the relationship can be represented in the ascertaining step in the form of at least one characteristic curve, preferably a characteristic curve in which the degree of shrinkage of the strand- or plate-shaped object is plotted over the refractive index. Using the determination of the refractive index and the at least one geometric parameter of the strand- or plate-shaped object which has not yet completely solidified, which occurs in the determining step, the position on the characteristic curve and, therefore, the shrinkage still to be expected up to complete solidification can then be determined in a simple manner. For example, the at least one geometric parameter can be normalized to the value after complete solidification. The degree of shrinkage can then be plotted in percent as a function of the refractive index.

If, for example, the wall thickness and the diameter of a tube are determined as geometric parameters, the degree of shrinkage $S_{wt}(n)$ is obtained for the wall thickness in percent as a function of the refractive index as follows:

$$S_{wt}(n) = \left(\frac{wt(n)}{wt_{end}} - 1\right) \cdot 100\%$$

Therein, $wt_{end}$ is the definitive wall thickness following complete solidification of the tube and $wt(n)$ is the wall thickness in the not yet completely solidified state, which is determined in the determining step.

The degree of shrinkage $S_d(n)$ of the diameter in percent is obtained as a function of the refractive index as follows:

$$S_d(n) = \left(\frac{d(n)}{d_{end}} - 1\right) \cdot 100\%$$

Therein, $d_{end}$ denotes the final diameter following complete solidification of the tube and $d(n)$ denotes the diameter in the not yet completely solidified state of the tube, which is recorded in the determining step.

According to a further embodiment, it can be provided that, in order to determine the refractive index and/or the at least one geometric parameter, terahertz radiation is emitted toward the strand- or plate-shaped object, terahertz radiation reflected by the strand- or plate-shaped object is detected, and the refractive index, for example in the region of the surface of the strand- or plate-shaped object, and/or the at least one geometric parameter such as, for example, the diameter or the wall thickness of a tube is/are determined from the detected terahertz radiation, in particular the intensity of the detected terahertz radiation. In the case of this embodiment, terahertz radiation is emitted toward the strand- or plate-shaped object. The terahertz radiation can partially enter the strand- or plate-shaped object. It is reflected at (external and, optionally, internal) boundary surfaces of the strand- or plate-shaped object and is detected by a suitable detector. The frequency of the terahertz radiation can, for example, lie in a frequency range of 10 GHz to 3 THz. It can be so-called millimeter waves. A transmitter emitting the terahertz radiation and a detector receiving the reflected terahertz radiation can substantially be arranged at the same location. They can be integrated into a transceiver, for example. Geometric parameters and the refractive index can be determined in a reliable manner with terahertz radiation, including in particular in difficult process environments in which optical systems such as lasers experience difficulties. A determination of the refractive index or of geometric parameters with terahertz radiation is described, for example, in WO 2016/139155 A1 or DE 10 2018 128 248 A1. Accordingly, reference is made to these printed documents.

The terahertz radiation can be modulated continuous wave terahertz radiation, in particular frequency-modulated continuous wave terahertz radiation. The terahertz radiation can also be pulse-modulated terahertz radiation or phase-modulated terahertz radiation. The frequency modulation can comprise a frequency burst or multiple frequency bursts. In particular, a so-called frequency sweep can occur, in which a predefined frequency range is traversed once or multiple times. A so-called time domain reflectometry method or frequency domain reflectometry method can, for example, be deployed as pulse-modulated or phase-modulated terahertz radiation. It is also conceivable that multiple discrete frequencies are sent, instead of one frequency spectrum.

The at least one geometric parameter can be determined from a propagation time measurement of the terahertz radiation emitted and then reflected by the strand- or plate-shaped object as described, by way of example, in WO 2016/139155 A1.

According to a further embodiment, it can be provided that at least one transmitter for emitting the terahertz radiation and at least one detector for detecting the terahertz radiation emitted and then reflected by the strand- or plate-shaped object is rotated about the longitudinal axis of the strand-shaped object, preferably along a circular path, or is displaced parallel to the surface of the plate-shaped object, during the emission and detection of the terahertz radiation. By rotating or, respectively displacing a pair consisting of a transmitter and a detector, by way of example a transceiver, values for the at least one geometric parameter can be recorded distributed over the circumference or, respectively, the plate width of the strand- or, respectively plate-shaped object. By way of example, in this way it is possible to establish a so-called sagging as can occur, by way of example, in the course of extrusion, that is to say a downward flowing of the material in the not yet completely solidified state. Out-of-roundness of a strand can also be ascertained in this way. This is likewise described in principle in WO 2016/139155 A1. Of course, it would also be conceivable to arrange multiple pairs of transmitters and receivers distributed over the circumference or, respectively parallel to the surface of the strand- or, respectively plate-shaped object and, in this way, to ascertain multiple measuring values over the circumference or, respectively parallel to the surface.

According to a further embodiment, the emitted terahertz radiation can penetrate the strand- or plate-shaped object prior to the detection, wherein the refractive index of the strand- or plate-shaped object is determined using a propagation time change of the terahertz radiation emitted and then received after penetrating the strand- or plate-shaped object caused by the material of the strand- or plate-shaped object. This is explained in principle in WO 2016/139155 A1. Thus, material constants of the strand- or plate-shaped object causing this change, in particular the refractive index and/or the dielectric constant, can be inferred from an ascertained change in the propagation speed, if the strand- or plate-shaped object is present in the radiation path, with respect to the radiation path without a strand- or plate-shaped object.

According to a further embodiment, the emitted terahertz radiation can be reflected by a reflector after penetrating the strand- or plate-shaped object and, prior to the detection, can penetrate the strand- or plate-shaped object again. By way of example, in the case of this embodiment, a reflector for the terahertz radiation is arranged opposite a transmitter for the terahertz radiation behind the strand- or plate-shaped object in the radiation direction of the terahertz radiation emitted by the transmitter. The reflector can be a cylindrically curved reflector, the longitudinal axis of which runs in the direction of the longitudinal axis of a strand. The center of curvature of the reflector can coincide with the center of curvature of a strand to be measured. That is to say, the focal line of the hollow cylindrical reflector then coincides with the longitudinal axis of the strand. A reflector amplifies the measuring signal because the signals routed back to the receiver by the reflector can also be used for evaluation. In addition, the reflector allows an even better discrimination of the different measuring signals received by the detector or detectors, particularly in the case of multiple reflections. Thus, a reflector permits the separate evaluation of the front and rear sides of a strand- or plate-shaped object facing, or, respectively facing away from the transmitter or, respectively detector, and can consequently avoid faults due to multiple reflections. In particular, a reflector permits a measurement by reflections of the terahertz radiation at boundary surfaces of the strand- or plate-shaped object both on the path of the radiation from the transmitter to the reflector and on the return path of the radiation from the reflector to the detector. By way of example, propagation times can be compared of signals which, on the one hand, travel from the transmitter/detector directly to the reflector and back to the transmitter/detector, and which, on the other hand, travel from the transmitter/detector directly to the reflector, then, coming from the reflector, are reflected at the back strand wall, or, respectively the inner and outer boundary surfaces of the rear strand wall, travel back to the reflector and, reflected again by the latter, travel back to the transmitter/detector. From this difference in propagation time, the distance can be inferred between the rear strand wall and the reflector with its known position, or, respectively the wall thickness of the rear strand wall facing the reflector, or, respectively the diameter of the strand. The reflector then simulates a further transmitter. That is to say that, with the aid of the reflector, the side of a strand facing the reflector can also be reliably measured when the original received signal from the rear strand wall is disturbed by multiple reflections between the transmitter/detector and the boundary surfaces of a strand facing the transmitter/detector.

According to a further embodiment, the at least one geometric parameter can be a wall thickness of a tube, wherein the optical wall thickness of the tube is determined from the detected terahertz radiation, and wherein the refractive index of the tube is determined from a comparison of the outside and inside diameters of the tube with the determined optical wall thickness. As already explained, the terahertz radiation penetrates at least partially into the strand- or plate-shaped object. It is reflected at two boundary surfaces at least. In this case, this can be, for example, the outer surface facing the transmitter and the inner surface facing away from the transmitter of a wall portion of a tube facing the transmitter. It is possible that a considerable portion of the radiation still exits from the inside of this wall portion facing away from the transmitter, which then, after passing through the hollow space delimited by the tube, is reflected on the inside, facing the transmitter, of an opposite wall portion of the tube facing away from the transmitter. All of the radiation components reflected at these boundary surfaces can be reflected back and received by the detector. On this basis, the optical wall thickness of wall portions of the tube can be determined, without knowledge of the refractive index of the material. The aforementioned embodiment is based on the finding that the refractive index can be calculated, in the simplest case, namely if it is assumed for the sake of simplicity that the penetrated wall portion facing the transmitter and the opposite wall portion of the tube facing away from the transmitter have the same wall thickness while taking into consideration the inside diameter and outside diameter, in particular the difference between the inside diameter and outside diameter of the tube. If the inside diameter or the outside diameter of the tube is mentioned in this respect, this means the geometric inside diameter and the geometric outside diameter. The inside and/or outside diameter of the tube can be determined by measurement. Various measuring methods are conceivable for this purpose, as is explained, for example, in DE 10 2018 128 248 A1. However, at least one of these diameters, for example the outside diameter, can also be assumed to be known. Moreover, with the reflection of the measurement radiation explained above at the mentioned boundary surfaces of the tube, it is also possible to determine the inside diameter on the basis of an evaluation of the reflected measurement radiation, since the refractive index of the air located in the hollow space of the tube is known.

BRIEF DESCRIPTION OF THE DRAWINGS

An exemplary embodiment of the invention is explained in greater detail below with reference to figures, wherein.

Unless otherwise indicated, the same reference numerals designate the same objects in the figures.

DETAILED DESCRIPTION OF THE INVENTION

Figure 1:
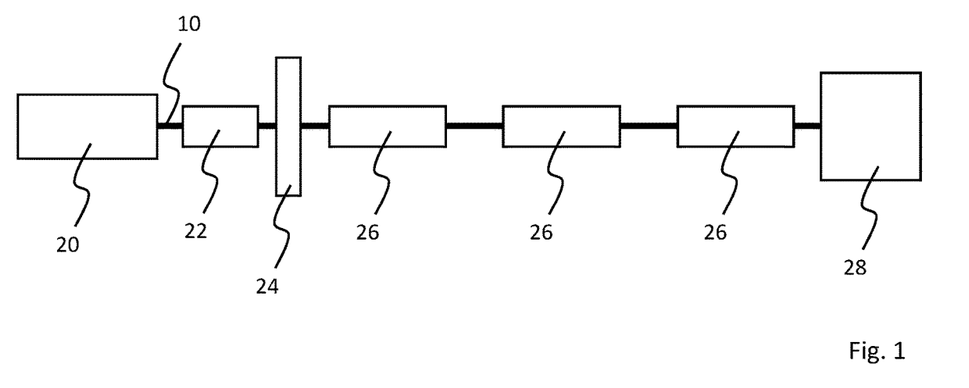
FIG. 1 schematically shows a side view of an embodiment of a device for determining at least one geometric parameter of an object.
Figure 2:
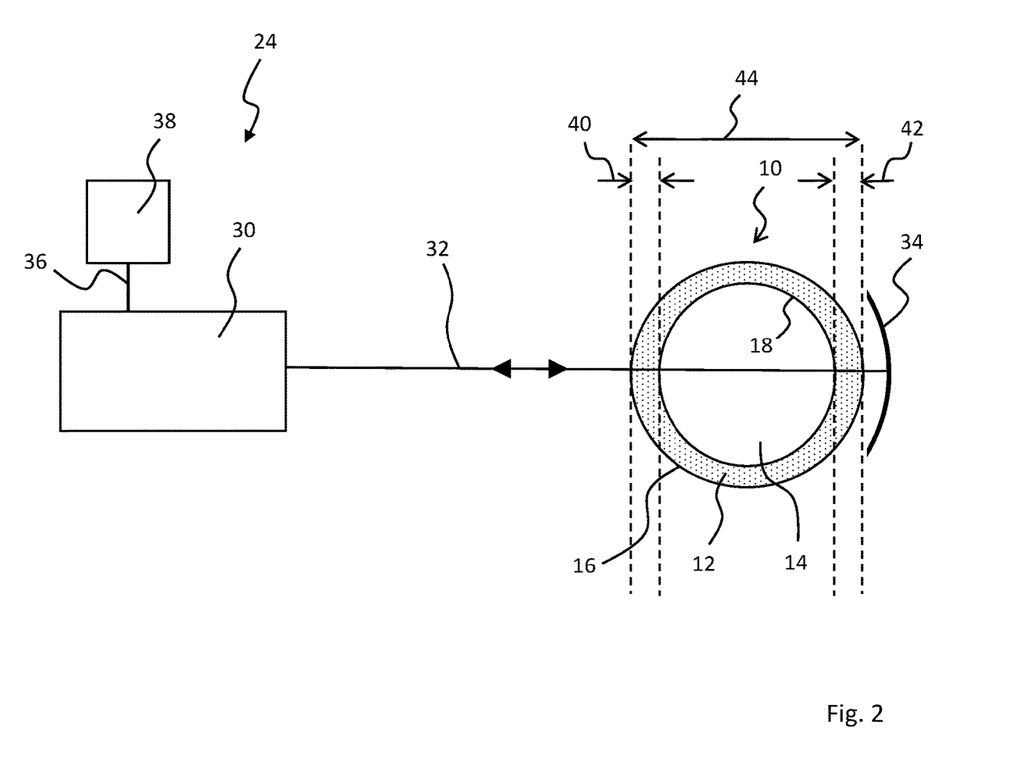
FIG. 2 schematically shows a partial sectional view of the embodiment of the device of FIG. 1.

A strand 10, in the present case a plastic tube 10, is depicted in FIGS. 1 and 2, which has a wall 12, a hollow space 14 delimited by the tube 10, an outer surface 16 which is circular in cross-section and an inner surface 18 which is likewise circular in cross-section, which delimits the hollow space 14. The plastic tube 10 is, in the present example, extruded with the aid of an extruder in an extrusion system 20 and conveyed along its longitudinal axis by means of a suitable conveying apparatus, from left to right in FIG. 1. After exiting from the tube head of the extruder of the extrusion system 20, the tube 10 initially passes through a first cooling section 22, in which the tube 10, which exits the extrusion system 20 heated to a great extent and not yet completely solidified, that is to say still having flowable components (molten mass), is cooled down. In its further course, the tube 10 passes through a measuring apparatus 24, in which the refractive index of the tube material and geometric parameters of the tube 10 such as, for example, the diameter and/or wall thickness, are determined in the manner explained in greater detail below. Following the measuring apparatus 24, the tube 10 passes through further cooling sections 26, in which further cooling occurs. After the tube 10 has completely solidified, the latter is cut to predefined lengths, for example in a cutting-to-length device 28.

The structure and the function of the measuring apparatus 24 are to be explained in greater detail with reference to FIG. 2. In the depicted example, the measuring apparatus 24 comprises a transceiver 30, in which a transmitter and a detector for terahertz radiation are combined. The transmitter emits terahertz radiation 32 toward the tube 10. The terahertz radiation is reflected at different boundary surfaces of the tube 10 and at a reflector 34 arranged opposite the transceiver 30 and travels back to the transceiver 30 where it is detected by the detector. The transceiver 30 is, furthermore, connected to an evaluating apparatus 38 via a line 36. The reflected radiation received by the detector generates corresponding measuring signals which are forwarded to the evaluating apparatus 38 via the line 36. In this way, the evaluating apparatus 38 can determine, for example, the wall thicknesses 40, 42 drawn in in FIG. 2, as well as the diameter 44, for example, using propagation time measurements. The evaluating apparatus 38 can also determine the refractive index of the strand material on the basis of the measuring signals received from the detector, as is described, by way of example, in WO 2016/139155 A1 or DE 10 2018 128 248 A1.

For example, the diameter 44 and the wall thicknesses 40, 42 of the tube 10 as well as the refractive index are determined with the measuring apparatus 24 at the measuring location shown in FIG. 1, at which the tube 10 has not yet completely solidified, that is to say still has flowable components. It is also possible that the transceiver 30 rotates, by way of example, along a circular path about the tube 10 and, thus, determines the geometric parameters and, optionally, also the refractive index, at different locations over the circumference of the tube 10. The reflector 34 can then either likewise rotate about the tube 10. However, it is also possible for the reflector 34 to be dispensed with.

Figure 3:
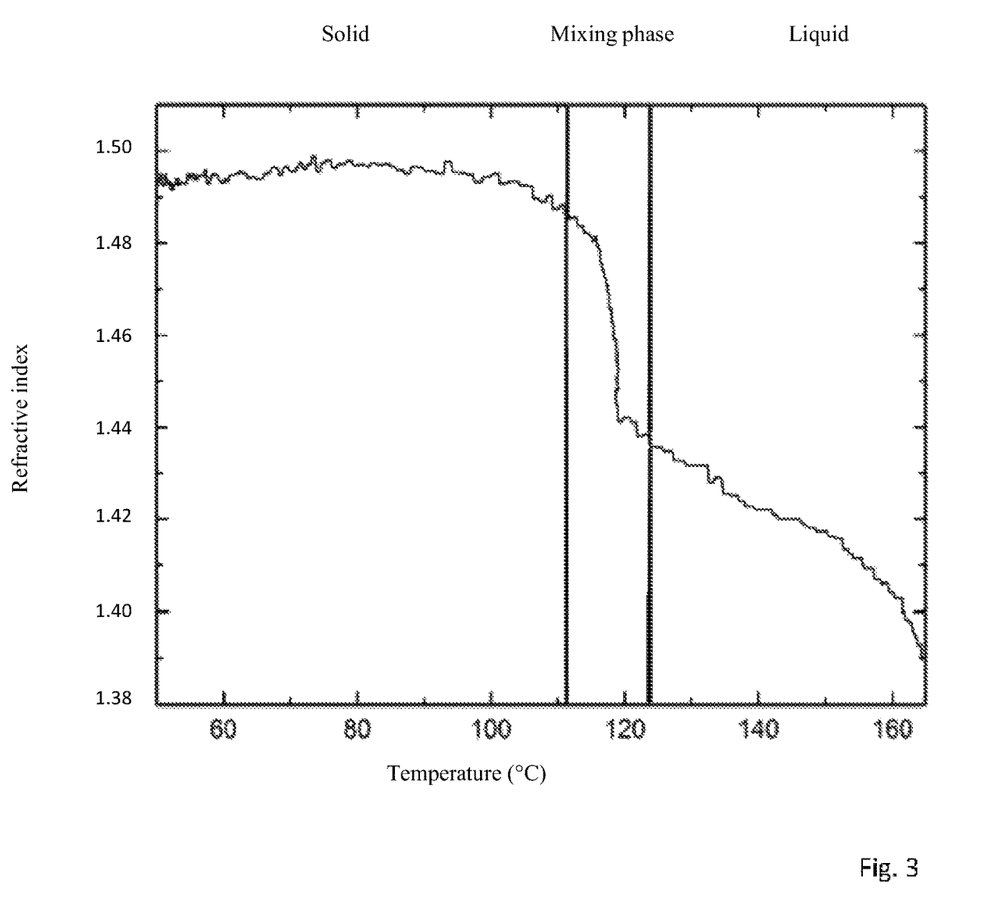
FIG. 3 shows a diagram illustrating the temperature dependence of the refractive index.

FIG. 3 shows the dependency of the refractive index on the temperature or, respectively on the aggregation state in the depicted example for pure polyethylene. On the one hand, it can be seen that the relationship between the refractive index and the temperature or, respectively the aggregation state is non-linear. On the other hand, it can be seen that the refractive index changes particularly significantly in the mixing phase, that is to say, at the transition between the solid and the liquid state. From the course of the refractive index at changing temperatures, it can further be seen that the refractive index remains largely unchanged between room temperature and approximately 100° C. From this, it can be deduced that when the extrusion system is at a standstill and after the tube 10 has cooled, an average refractive index results, which corresponds to the cold value. It is therefore now possible to also calibrate the cold value of the refractive index, which can be ascertained as explained above, from the intensity of the echoes of the outer shell of the tube, for this tube diameter. During subsequent production, the cold value of the refractive index can thus be ascertained in the manner indicated as well and changes in the material can be recognized during production and can be adjusted to the newly recorded refractive index with respect to the shrinkage to be expected.

As explained, FIG. 3 shows the dependency of the refractive index on the temperature for pure polyethylene. In general, an HDPE (high-density polyethylene) with additives is utilized for tubes. The tubes are preferably colored black by adding carbon black (soot). The viscosity of the molten mass is determined with further additives and, therefore, an optimal flow behavior at high pressure and high temperature in the extruder with viscous flow behavior after leaving the tube head until the molten mass finally cools down in the tube wall in order to keep sagging of the molten mass as low as possible. While the extremely wide range of properties of the material are known for pure PE, these can only be transferred to a typical HDPE with additives to a limited extent. This applies to the melting temperature, the density, the refractive index, the absorption and all of the temperature dependencies thereof for millimeter waves. These problems can be addressed with the method according to the invention.

Figure 4A:
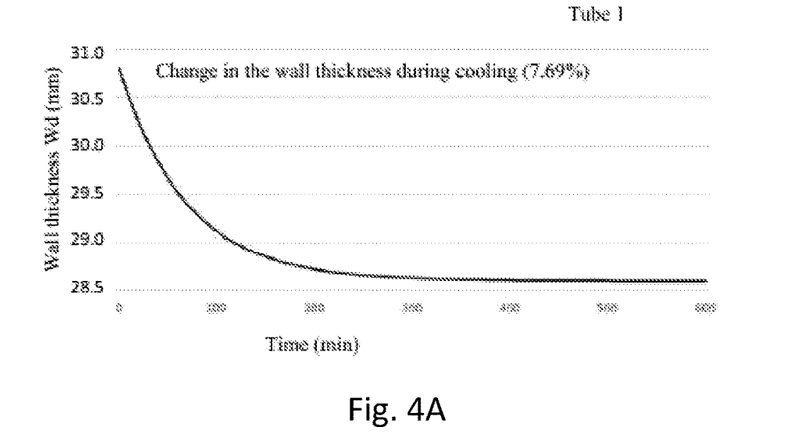
FIG. 4A schematically shows a diagram of the cooling behavior relating to measured wall thickness of a first object ("tube 1").
Figure 4B:
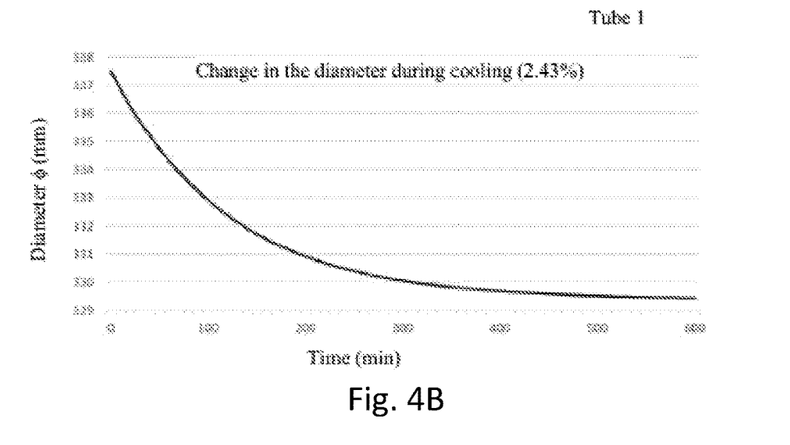
FIG. 4B schematically shows a diagram of the cooling behavior related to the diameter of the first object ("tube 1").
Figure 4C:
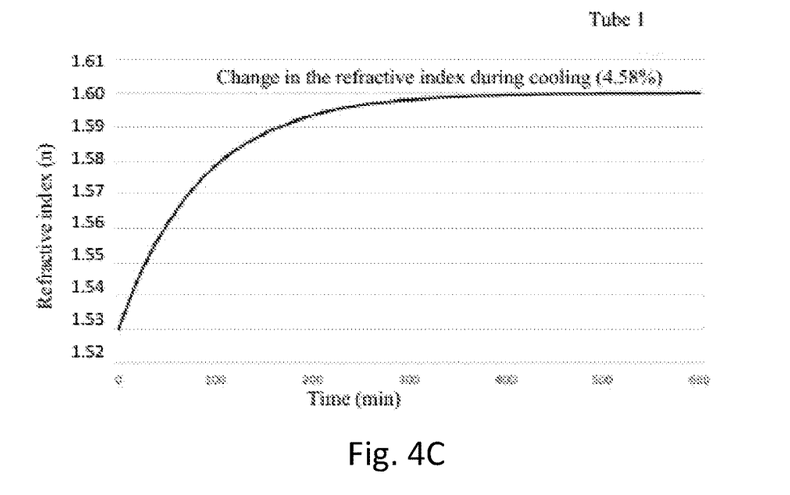
FIG. 4C schematically shows a diagram of the cooling behavior related to the refractive index of the first object ("tube 1").

The wall thickness, the diameter and the refractive index for a first medium-sized tube ("tube 1") extruded, by way of example, in the extrusion system 20 shown in FIG. 1 are plotted in each case over time in FIGS. 4A-C. The wall thickness, the diameter and the refractive index for a second, smaller-sized tube ("tube 2") extruded in the extrusion system 20 shown, by way of example, in FIG. 1 are in each case likewise plotted over time in FIGS. 5A-C. The first and second tubes can differ, for example, in terms of their material composition and/or their dimensions. At the zero point in time, the extrusion system 20 was stopped for the measurement carried out and the tubes were accordingly no longer conveyed further along their longitudinal axis. The measured values were then acquired over a longer period of time until the tubes have completely solidified, that is to say when they no longer contained any viscous components. A substantially inverse behavior of the refractive index to the wall thickness or, respectively the diameter can be seen, in each case, for the two series of measured values. While the refractive index increases as the solidification increases, the measured values for the wall thickness and diameter decrease accordingly. Furthermore, it can be seen that considerably different courses are demonstrated with the series of measured values for the two different measured tubes.

Figure 5A:
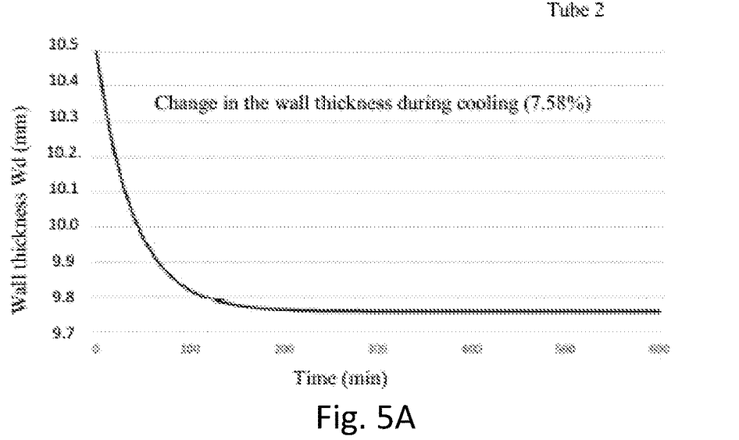
FIG. 5A schematically shows a diagrams of the cooling behavior related to wall thickness of a second object ("tube 2").
Figure 5B:
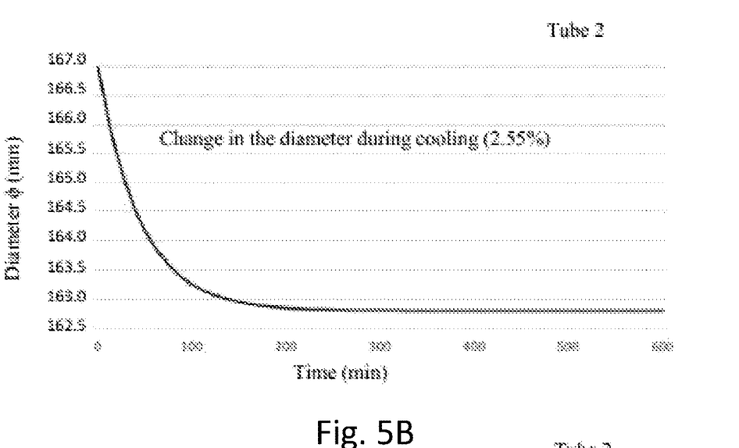
FIG. 5B schematically shows a diagram of the cooling behavior related to the diameter of the second object ("tube 2").
Figure 5C:
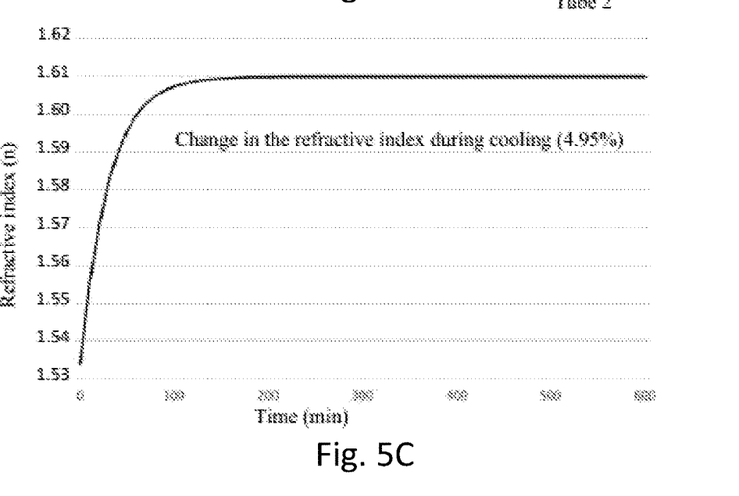
FIG. 5C schematically shows a diagram of the cooling behavior related to the refractive index of the second object ("tube 2").
Figure 6:
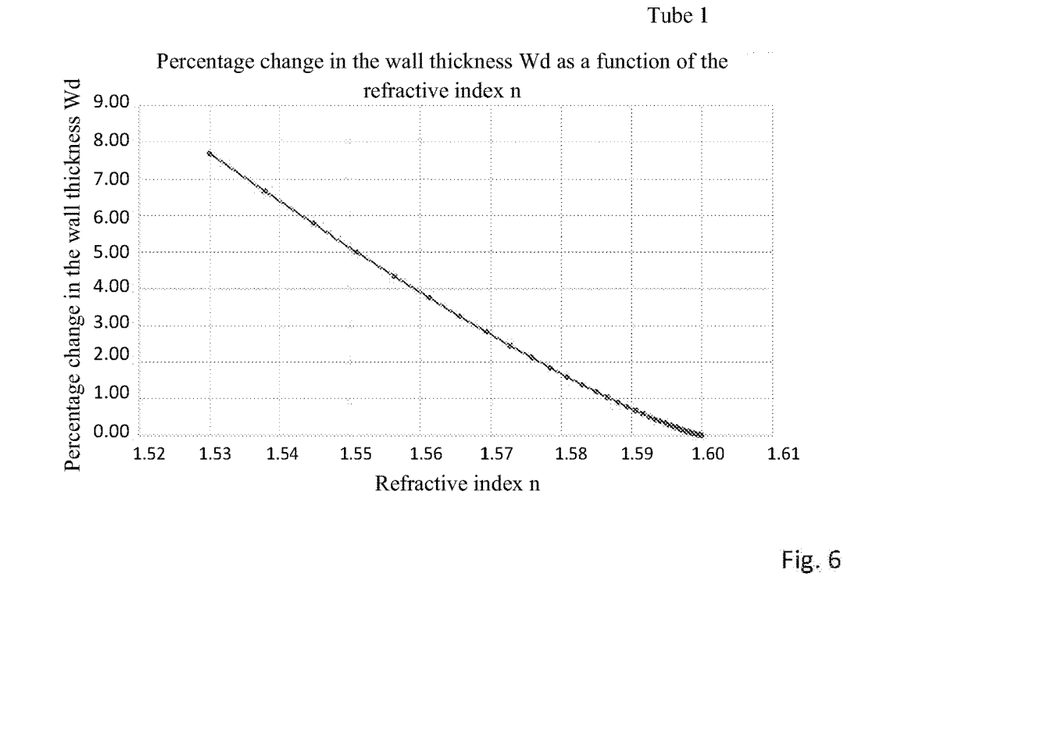
FIG. 6 schematically shows a characteristic curve of the degree of shrinkage for the wall thickness as a geometric parameter for the first series of measurements ("tube 1").
Figure 7:
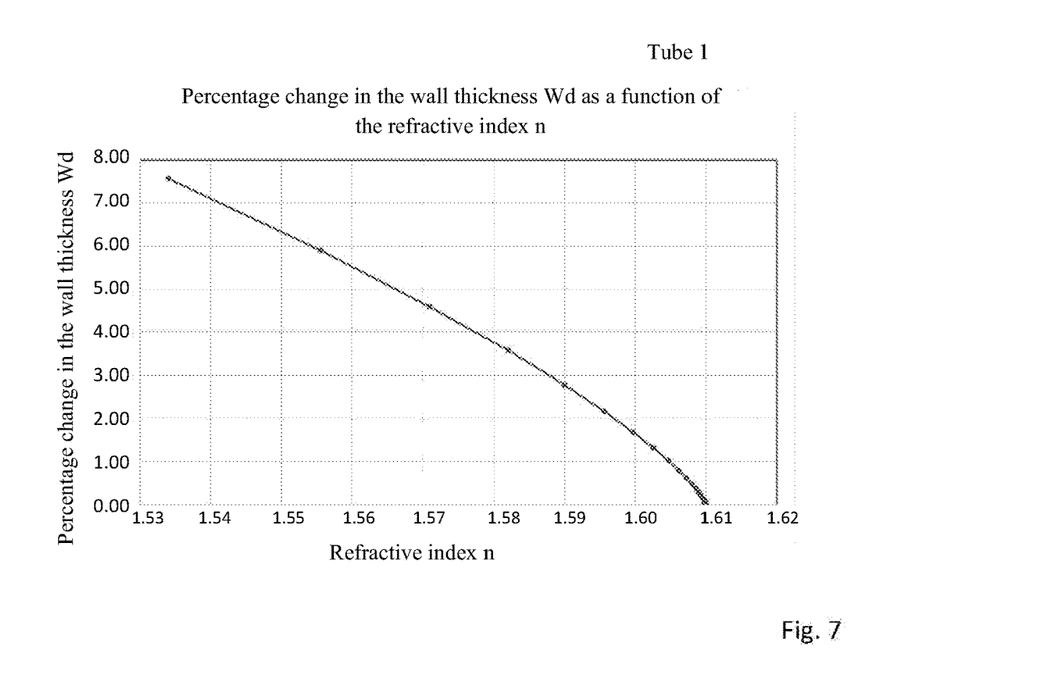
FIG. 7 schematically shows a characteristic curve of the degree of shrinkage as a geometric parameter for the second series of measurements ("tube 2").

FIGS. 6 and 7 show characteristic curves determined with the method according to the invention, wherein the characteristic curve shown in FIG. 6 was ascertained using the data depicted in FIGS. 4A-C and the characteristic curve shown in FIG. 7 was ascertained using the data shown in FIGS. 5A-C. The relationship between the shrinkage and the refractive index for the wall thickness of the respective tube is shown in each case. In order to create the characteristic curves shown in FIGS. 6 and 7, the wall thickness was normalized to the value following complete solidification. The degrees of shrinkage plotted in each case on the y-axis in FIGS. 6 and 7 in percent as a function of the refractive index plotted on the x-axis for the wall thickness are obtained according to:

$$S_{wt}(n) = \left(\frac{wt(n)}{wt_{end}} - 1\right) \cdot 100\%$$

with the variables explained above.

These characteristic curves created in the ascertaining step according to the invention can now be used to calculate and, therefore, predict the wall thickness in the completely solidified state using the values for the refractive index and the wall thickness of the tubes which are not yet completely solidified, which are ascertained in the determining step. This can be done for the diameter in a corresponding manner. The refractive index in the completely solidified state can be measured or assumed to be known for the respective material composition. In particular, it is possible to establish the current position on the respective characteristic curve depicted in FIGS. 6 and 7, using the values determined in the determining step, so that the further shrinkage to be expected until the respective tube has completely solidified can accordingly be read off in the characteristic curve.

LIST OF REFERENCE NUMERALS

10 Strand, tube
12 Wall
14 Hollow space
16 Outer surface
18 Inner surface
20 Extrusion system
22, 26 Cooling section
24 Measuring apparatus
28 Cutting-to-length device
30 Transceiver
32 Terahertz radiation
34 Reflector
36 Line
38 Evaluating apparatus
42 Wall thicknesses
44 Diameter

The invention claimed is:

1. A method for determining at least one geometric parameter of an object comprising a molten component, comprising:
    determining a relationship between a refractive index of the object and a shrinkage occurring during a solidification of the object;
    determining the refractive index and at least one geometric parameter of the object comprising the molten component using a measuring apparatus; and
    determining at least one geometric parameter of the solidified object from the refractive index and the at least one geometric parameter of the object comprising the molten component using the measuring apparatus and taking into account the determined relationship between the refractive index of the object and the shrinkage occurring during the solidification of the object.

2. The method according to claim 1, wherein the object comprises a tube.

3. The method according to claim 2, wherein the at least one geometric parameter comprising the molten component is a diameter or a wall thickness of the tube, wherein the relationship between the refractive index of the tube and a shrinkage occurring during the solidification of the tube is determined for at least one of (i) the diameter of the tube and (ii) the wall thickness of the tube.

4. The method according to claim 1, wherein the object comes from an extrusion system and is conveyed along a longitudinal direction during the determination of the at least one geometric parameter comprising the molten component.

5. The method according to claim 1, wherein the determining the relationship between the refractive index of the object and the shrinkage occurring during the solidification of the object is accomplished by determining the refractive index and the at least one geometric parameter of the object comprising the molten component.

6. The method according to claim 5, wherein the refractive index and the at least one geometric parameter of the object comprising the molten component is determined at least one of (i) multiple points in time and (ii) at multiple locations of the object.

7. The method according to claim 1, wherein the determining the relationship between the refractive index of the object and the shrinkage occurring during the solidification of the object is accomplished by allowing the object to solidify at least along a longitudinal portion, wherein the refractive index and the at least one geometric parameter of the object are determined multiple times during the solidification of the object.

8. The method according to claim 1, wherein the determining the relationship between the refractive index of the object and the shrinkage occurring during the solidification of the object is accomplished using at least one characteristic curve in which a degree of shrinkage of the object is plotted over the refractive index.

9. The method according to claim 1, further comprising emitting terahertz radiation towards the object, wherein the refractive index and the at least one geometric parameter are determined from the terahertz radiation reflected by the object comprising the molten component.

10. The method according to claim 9, wherein the terahertz radiation comprises one of (i) a modulated continuous wave terahertz radiation, (ii) a pulse-modulated terahertz radiation, and (iii) a phase-modulated terahertz radiation.

11. The method according to claim 9, further comprising determining the at least one geometric parameter from a propagation time measurement of the emitted terahertz radiation and the terahertz radiation reflected by the object comprising the molten component.

12. The method according to claim 9, further comprising providing at least one transmitter configured to emit the terahertz radiation and at least one detector configured to detect the emitted terahertz radiation and the reflected terahertz radiation by the object, wherein the at least one detector is further configured to move relative to the object during the emission and detection of the terahertz radiation.

13. The method according to claim 12, wherein the emitted terahertz radiation penetrates the object prior to the detection, and wherein the refractive index of the object is determined using a propagation time change of the terahertz radiation emitted and then received after penetrating the object caused by a material comprising the object comprising the molten component.

14. The method according to claim 13, further comprising providing a reflector configured to reflect the terahertz radiation penetrating the object comprising the molten component a first time and, prior to the detection, penetrates object comprising the molten component a second time.

15. The method according to claim 13, wherein the at least one geometric parameter is a wall thickness of a tube, wherein an optical wall thickness of the tube is determined from the detected terahertz radiation, and wherein the refractive index of the tube is determined from a comparison of outside and inside diameters of the tube with the optical wall thickness.

* * * * *